(12) United States Patent
Bar-Haim et al.

(10) Patent No.: US 9,188,896 B2
(45) Date of Patent: Nov. 17, 2015

(54) ELECTROSTATIC INK COMPOSITION

(75) Inventors: Gil Bar-Haim, Nes Ziona (IL); Anatoly Sobolevsky, Nes Ziona (IL); Yaron Grinwald, Nes Ziona (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 41 days.

(21) Appl. No.: 14/347,569

(22) PCT Filed: Sep. 30, 2011

(86) PCT No.: PCT/EP2011/067182
§ 371 (c)(1),
(2), (4) Date: Mar. 26, 2014

(87) PCT Pub. No.: WO2013/044991
PCT Pub. Date: Apr. 4, 2013

(65) Prior Publication Data
US 2014/0234771 A1    Aug. 21, 2014

(51) Int. Cl.
| | |
|---|---|
| G03G 9/00 | (2006.01) |
| G03G 9/12 | (2006.01) |
| G03G 9/135 | (2006.01) |
| C09D 11/52 | (2014.01) |
| C09D 11/10 | (2014.01) |
| G03G 9/13 | (2006.01) |
| G03G 9/08 | (2006.01) |
| G03G 13/10 | (2006.01) |

(52) U.S. Cl.
CPC ... *G03G 9/12* (2013.01); *C09D 11/10* (2013.01); *C09D 11/52* (2013.01); *G03G 9/0804* (2013.01); *G03G 9/122* (2013.01); *G03G 9/13* (2013.01); *G03G 9/131* (2013.01); *G03G 9/132* (2013.01); *G03G 9/135* (2013.01); *G03G 13/10* (2013.01)

(58) Field of Classification Search
CPC .................................................. G03G 9/135
USPC ........................................................ 430/115
See application file for complete search history.

(56) References Cited

U.S. PATENT DOCUMENTS

| | | | |
|---|---|---|---|
| 5,192,638 A | 3/1993 | Landa et al. | |
| 5,266,435 A | 11/1993 | Almog | |
| 5,346,796 A | 9/1994 | Almog | |
| 5,436,706 A | 7/1995 | Landa et al. | |
| 5,610,694 A | 3/1997 | Lior et al. | |
| 5,737,666 A | 4/1998 | Lior et al. | |
| 6,070,042 A | 5/2000 | Landa et al. | |

(Continued)

FOREIGN PATENT DOCUMENTS

| | | |
|---|---|---|
| KR | 100759251 | 9/2007 |
| WO | 2005040265 | 5/2005 |

(Continued)

OTHER PUBLICATIONS

Industrial Minerals and Their Uses, A Handbook & Formulary, edited by Peter A. Ciullo, 1996, p. 135 Paints & Coatings.

(Continued)

*Primary Examiner* — Mark A Chapman
(74) *Attorney, Agent, or Firm* — Hewlett-Packard Patent Department

(57) ABSTRACT

The present invention provides an electrostatic ink composition comprising a carrier liquid, a resin, a pigment and a conductive polymer. Method for producing the electrostatic ink composition and methods for printing the composition are also disclosed.

14 Claims, 7 Drawing Sheets

(56) References Cited

U.S. PATENT DOCUMENTS

| | | |
|---|---|---|
| 6,337,168 B1 | 1/2002 | Almog |
| 6,365,318 B1 * | 4/2002 | Moffat et al. ............ 430/137.15 |
| 6,391,509 B1 | 5/2002 | Drappel et al. |
| 6,866,378 B2 | 3/2005 | Wotton et al. |
| 2003/0144465 A1 | 7/2003 | Leenders et al. |
| 2006/0027791 A1 | 2/2006 | Tahon et al. |
| 2008/0187651 A1 | 8/2008 | Lee et al. |

FOREIGN PATENT DOCUMENTS

| | | |
|---|---|---|
| WO | 2005054959 | 6/2005 |
| WO | 2007130069 | 11/2007 |
| WO | 2009029045 | 3/2009 |
| WO | 2009099707 | 8/2009 |
| WO | 2009127006 | 10/2009 |
| WO | 2010123504 | 10/2010 |
| WO | 2010141129 | 12/2010 |
| WO | 2011110221 | 9/2011 |

OTHER PUBLICATIONS

Paint and Surface Coatings Theory and Practice, 2nd Edition, edited by R. Lambourne and T.A. Strivens, 1999, pp. 154-158.
Panipol F Technical Data Sheet.
Brydson, Plastics Materials, 7th Edition, 1999, pp. 886-889.

* cited by examiner

ELECTROSTATIC INK COMPOSITION

BACKGROUND

In general, electrostatic printing processes typically involve creating an image on a photoconductive surface, applying an ink having charged particles to the photoconductive surface, such that they selectively bind to the image, and then transferring the charged particles in the form of the image to a print substrate.

Electrostatic printing systems will now be described in a little more detail. The photoconductive surface is typically on a cylinder and is often termed a photo imaging plate (PIP). The photoconductive surface is selectively charged with a latent electrostatic image having image and background areas with different potentials. For example, an electrostatic ink composition comprising charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member, which can be a soft swelling blanket, and then to the print substrate. Variations of this method utilize different ways for forming the electrostatic latent image on a photoreceptor or on a dielectric material.

Typically, an electrostatic ink composition comprises a thermoplastic resin as the basis for the toner particles, and a non-polar liquid as a carrier liquid in which the toner particles are dispersed. Generally, the toner particles contain a colorant such as a pigment. A charge director, also called charge control agent or imaging agent, is also typically added to the dispersion to induce charge on the particles.

In some systems, the electrostatic ink composition is applied to the PIP by pumping the ink between a stationary electrode and the PIP. Such a system is illustrated in WO 2005/054959, which is incorporated herein by reference in its entirety. Other electrostatic printing systems include a binary ink development (BID) unit. In such a system, the ink is applied to the photoconductive surface by a developer roller. Often, a different developer roller is used for each different color ink (e.g. cyan, magenta, yellow and black). Ink is applied to the developer roller by passing an electrostatic ink composition between a stationary charged electrode and the developer roller. Ideally, the charged toner particles should form a uniform layer on the development roller. The developer roller rotates, such that the charged particles contact the PIP electrically. Such a system is illustrated in U.S. Pat. No. 5,436,706, U.S. Pat. No. 5,610,694 and U.S. Pat. No. 5,737,666, all of which are incorporated herein by reference in their entirety.

The present inventors found that some electrostatic inks suffered from the problem of optical density reduction (if developing voltage is kept constant) or a rise in developing voltages (if developing voltage is corrected to maintain the same optical density). An increase in the drop in optical density is considered to correlate with an increase in the charge on the resin particles. The problem was observed on low coverage printing and became severe after only a few hundred impressions. The problem seemed particularly acute with inks containing organic pigments with conjugated aromatic rings, such as phthalocyanines, which are often included in cyan inks.

DETAILED DESCRIPTION

Figure 1:
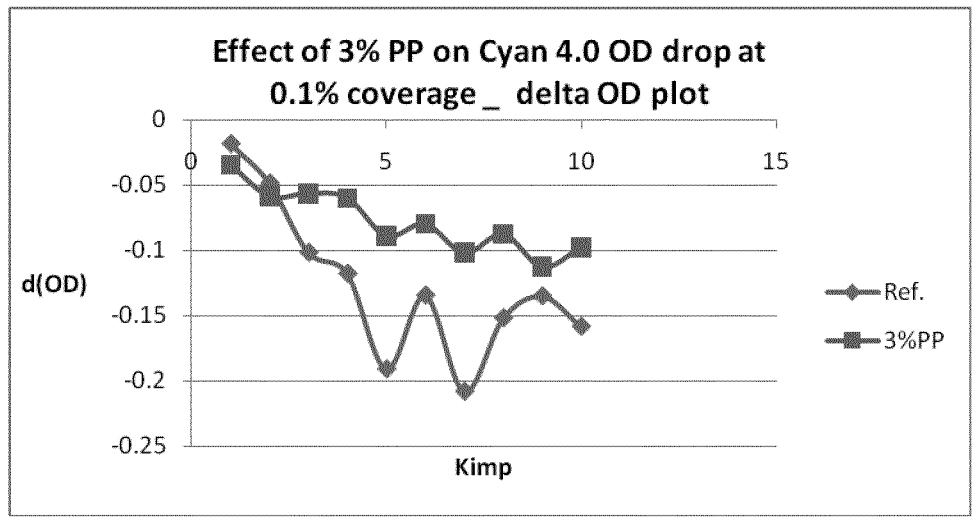
FIG. 1 shows the change in optical density (d(OD), y axis), against the number of impressions for a reference electrostatic ink composition and a cyan electrostatic ink composition that contains 3 wt % polypyrrole, at a constant developing voltage, when printing at 0.1% coverage. This is described in more detail in the Examples.

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It is noted that, as used in this specification and the appended claims, the singular forms "a," "an," and "the" include plural referents unless the context clearly dictates otherwise.

As used herein, "carrier liquid," "carrier," or "carrier vehicle" refers to the fluid in which the polymers, particles, colorant, charge directors and other additives can be dispersed to form a liquid electrostatic ink or electrophotographic ink. Such carrier liquids and vehicle components are known in the art. Typical carrier liquids can include a mixture of a variety of different agents, such as surfactants, co-solvents, viscosity modifiers, and/or other possible ingredients.

As used herein, "electrostatic ink composition" generally refers to a ink composition in liquid form that is typically suitable for use in an electrostatic printing process, sometimes termed an electrophotographic printing process. The electrostatic ink composition may comprise chargeable particles of a resin, which may be as described herein, dispersed in a carrier liquid, which may be as described herein.

As used herein, "pigment" generally includes pigment colorants, magnetic particles, aluminas, silicas, and/or other ceramics or organo-metallics, whether or not such particulates impart color. Thus, though the present description primarily exemplifies the use of pigment colorants, the term "pigment" can be used more generally to describe not only pigment colorants, but other pigments such as organometallics, ferrites, ceramics, etc.

As used herein, "copolymer" refers to a polymer that is polymerized from at least two monomers.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer, as known in the art. If a melt flow rate of a particular polymer is specified, unless otherwise stated, it is the melt flow rate for that polymer alone, in the absence of any of the other components of the electrostatic ink composition.

As used herein, "acidity," "acid number," or "acid value" refers to the mass of potassium hydroxide (KOH) in milligrams that is required to neutralize one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa-s or cPoise, as known in the art. Alternatively, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate. If the melt viscosity of a particular polymer is specified, unless otherwise stated, it is the melt viscosity for that polymer alone, in the absence of any of the other components of the liquid toner composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "incompatible wax" refers to a wax that is incompatible with the polymer blend. Specifically, the wax phase separates from the polymer blend phase upon the cooling of the polymer fused mixture on the substrate during and after the transfer of the ink film from the blanket.

As used herein, "electrostatic printing" or "electrophotographic printing" generally refers to the process that provides an image that is transferred from a photo imaging substrate either directly or indirectly via an intermediate transfer member. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrostatic ink composition to an electric field, e.g. an electric field having a field gradient of 50-400V/μm, or more, optionally 600-900V/μm, or more.

As used herein, "substituted" means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, etc.

As used herein, "heteroatom" refers to nitrogen, oxygen, halogens, phosphorus, or sulfur.

As used herein, "alkyl" refers to a branched, unbranched, or cyclic saturated hydrocarbon group, which typically, although not necessarily, contains from 1 to about 50 carbon atoms, or 1 to about 40 carbon atoms, or 1 to about 30 carbon atoms, or 1 to about 10 carbon atoms, or 1 to about 5 carbon atoms for example. Likewise, the term "aryl" refers to a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon atoms, or 5 to 30 carbon atoms or more, and may be selected from, phenyl and naphthyl.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience.

However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Unless otherwise stated, any optional or preferred feature can be combined with any aspect of the invention or any other optional or preferred feature.

In a first aspect, the present invention relates to an electrostatic ink composition comprising a carrier liquid, a resin, a pigment and a conductive polymer. In an embodiment, the electrostatic ink composition comprises particles comprising the resin, the pigment and the conductive polymer dispersed in the carrier liquid.

In a second aspect, the present invention further provides a method of producing an electrostatic ink composition, the method comprising:
  combining a carrier liquid, a resin, a pigment, a conductive polymer, such that the electrostatic ink composition of the first aspect is formed.

In a third aspect, the present invention provides a method of electrophotographic printing an electrostatic ink composition according to the first aspect, wherein the ink composition comprises particles comprising the resin, the pigment and the conductive polymer dispersed in the liquid carrier, the method comprising:
  forming a latent electrostatic image on a surface;
  contacting the surface with the electrostatic ink composition according to the first aspect, such that at least some of the particles adhere to the surface to form a developed toner image on the surface, and transferring the toner image to a print substrate.

The present inventors have found that including a conductive polymer in an electrostatic ink composition reduces the decrease in optical density, compared to a similar composition excluding a conductive polymer.

Conductive Polymer

Conductive polymers are polymers that can conduct an electric charge. In the present application, a conductive polymer may also be termed an intrinsically electronically conductive polymer or intrinsically conductive or conducting polymer. Intrinsically electronically conductive polymers conduct electrical charge along their backbone, generally along a conjugated system of double bonds with π-electrons. The polymers are usually present with a dopant, which is either oxidising or reducing, to add or remove electrons from the conduction band, and thus increase the electrical conductivity of the polymer. Conductive polymers, e.g. intrinsically conducting polymers, are described in many prior art documents, including, but not limited to, Plastics Materials, Seventh Edition, authored by J. A. Brydson, published by Butterworth Heinemann, on pages 886 to 889; this document is incorporated herein by reference in its entirety.

The conductive polymer may be selected from a polyfluorene, a polyphenylene, a polypyrene, a polyazulene, a polynaphthalene, a poly(acetylene), a poly(p-phenylene vinylene), a poly(pyrrole), a polycarbazole, a polyindole, a polyazepines, a polyaniline, a poly(thiophene), a poly(3,4-ethylenedioxythiophene), a poly(p-phenylene sulfide), a polythienylenevinylene and a poly-1,6-heptadiyne. The conductive polymer may be an optionally substituted polymer. A substituted polymer may have one or more substituents on its backbone.

The conductive polymer may comprise polymerised repeating units comprising aryl or heteroaryl rings, wherein the aryl or heteroaryl rings are conjugated to one another when polymerised. Preferably, the conductive polymer is selected from polyaniline and polypyrrole. Polyaniline is available commercially, for example under the trade name Panipol from Panipol Oy Ltd. Polypyrrole is available commercially, for example from Sigma Aldrich. Polyaniline and polypyrrole are low oxidation potential polymers.

A polyaniline may include repeating units of formula I below,

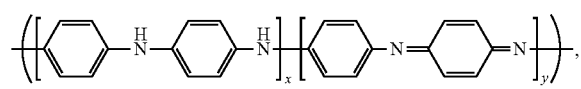

formula I wherein the repeating unit is represented by the formula within the rounded brackets, having two subunits represented by the formulae in the square brackets,
x is 0 or 1, y is 0 or 1, and at least one of x and y is 1.

In a leucoemeraldine polymer, x=1 and y=0. In an emeraldine polymer, x=1 and y=1. In an emeraldine salt, typically, the emeraldine polymer is combined with an acid. In an emeraldine salt, typically a bi polaron is formed and the 2 radical electrons in this species form a bond and the two positive(+) sites are neutralized by anionic counter ions. In a pernigraniline polymer, x=0 and y=1. In formula I, preferably, x=1 and y=1.

In an embodiment, in formula I, x=1 and y=1, and the polyaniline is optionally doped with an acid, for example sulphuric acid, a sulphonic acid or hydrochloric acid. A sulphonic acid may be an acid of the formula R—S(=O)$_2$(OH), in which R is an alkyl or an aryl, wherein optionally the alkyl is selected from $C_{1-10}$ alkyl and aryl may be selected from phenyl or naphthyl.

The polyaniline may be selected from leucoemeraldine, emeraldine, and pernigraniline. The polyaniline is preferably emeraldine, preferably doped with an acid, including, but not limited to, sulphuric acid, a sulphonic acid or hydrochloric acid.

A polypyrrole may include repeating units of formula II below

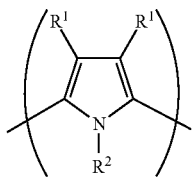

formula II wherein the repeating unit is represented by the formula within the rounded brackets,
wherein each $R^1$ is independently selected so as to be the same or different at each occurrence and is selected from hydrogen, alkyl, alkenyl, alkoxy, alkanoyl, alkylthio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, amidosulfonate, benzyl, carboxylate, ether, ether carboxylate, ether sulfonate, and urethane; or both $R^1$ groups together may form an alkylene or alkenylene chain completing a 3, 4, 5, 6, or 7-membered aromatic or alicyclic ring, which ring may optionally include one or more divalent nitrogen, sulfur or oxygen atoms; and $R^2$ is independently selected so as to be the same or different at each occurrence and is selected from hydrogen, alkyl, alkenyl, aryl, alkanoyl, alkylthioalkyl, alkylaryl, arylalkyl, amino, epoxy, silane, siloxane, alcohol, amidosulfonate, benzyl, carboxylate, ether, ether carboxylate, ether sulfonate, sulfonate, and urethane.

In an embodiment, $R^2$ is the same or different at each occurrence and is independently selected from hydrogen, alkyl, alkenyl, alkoxy, cycloalkyl, cycloalkenyl, alcohol, amidosulfonate, benzyl, carboxylate, ether, ether carboxylate, ether sulfonate, sulfonate, urethane, epoxy, silane, siloxane, and alkyl substituted with one or more of sulfonic acid, carboxylic acid, acrylic acid, phosphoric acid, phosphonic acid, halogen, nitro, cyano, hydroxyl, epoxy, silane, or siloxane moieties.

In an embodiment, $R^1$ is selected from hydrogen, alkyl, and alkyl substituted with one or more of sulfonic acid, carboxylic acid, acrylic acid, phosphoric acid, phosphonic acid, halogen, cyano, hydroxyl, epoxy, silane, or siloxane moieties.

In an embodiment, the polypyrrole is unsubstituted and both $R^1$ and $R^2$ are hydrogen.

Preferably, the conductive polymer constitutes at least 0.5% by weight, optionally at least 1% by weight, of the solids content of the electrostatic ink composition. For the avoidance of doubt, all weight percentages for conductive polymers stated herein include any dopants that may be present with the polymer.

Preferably, the conductive polymer constitutes 1% to 5% by weight, optionally 1% to 4% by weight, of the solids content of the electrostatic ink composition. Preferably, polypyrrole constitutes from about 2% to about 4% by weight, optionally from about 2.5% to about 3.5% by weight, optionally from about 2.7% to about 3.3% by weight, optionally about 3% by weight, of the solids content of the electrostatic ink composition. Preferably, polyaniline constitutes from about 0.5% to about 5% by weight, optionally from about 0.5% to about 4% by weight, optionally from about 0.5% to about 3% by weight, optionally 0.5% to 2% by weight, optionally from 1 to 1.6% by weight, optionally about 1.3% by weight of the solids content of the electrostatic ink composition.

The conductive polymer may be doped with any suitable dopant, which may be selected from oxidising dopants, acids and reducing dopants. Such dopants are known to the skilled person. Oxidising dopants include, but are not limited to, $AsF_5$, $SbF_5$, $NOPF_6$, and $FeCl_3$. Reducing dopants include, but are not limited to, alkali metals such as sodium and lithium. Acid dopants include, but are not limited to, hydrochloric acid, a sulphonic acid and sulphuric acid.

The conductive polymer may have a conductivity of at least 1 S/cm, optionally at least 5 S/cm, optionally at least 8 S/cm, optionally at least 10 S/cm, when measured at room temperature (25° C. or above). The conductive polymer may have a conductivity about 1 S/cm to 50 S/cm, optionally 5 to 45 S/cm, optionally 10 to 50 S/cm, optionally 30 to 50 S/cm, when measured at room temperature (25° C. or above). The conductivity of the conducting polymer may be measured using any technique in the art, preferably a standard technique. In an embodiment, the conductivity of the conducting polymer is measured using ASTM D4496-04e1, which is incorporated herein by reference in its entirety. Some common terminology on electrical insulation can be found in ASTM D1711.

The ratio of mass of conducting polymer:mass of pigment in the electrostatic ink composition may be in the range of from 1:50 to 1:2, optionally 1:26 to 1:3.

Carrier Liquid

Generally, the carrier liquid acts as a dispersing medium for the other components in the liquid electrophotographic ink. For example, the carrier liquid can comprise or be a hydrocarbon, silicone oil, vegetable oil, etc. The carrier liquid can include, but is not limited to, an insulating, non-polar, non-aqueous liquid that is used as the medium for toner particles. The carrier liquid can include compounds that have a resistivity in excess of about $10^9$ ohm-cm. The carrier liquid may have a dielectric constant below about 5, optionally below about 3.

The carrier liquid can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Embodiments of the carrier liquids include, but are not limited to, aliphatic hydrocarbons, isoparaffinic compounds, paraffinic compounds, dearomatized hydrocarbon compounds, and the like. In particular, the carrier liquids can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140 ™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™). The carrier liquids and other components of the present disclosure are described in U.S. Pat. No. 6,337,168, U.S. Pat. No. 6,070,042, and U.S. Pat. No. 5,192,638, all of which are incorporated herein by reference.

In an embodiment, the carrier liquid constitutes about 20 to 99.5% by weight of the electrostatic ink composition, optionally 50 to 99.5% by weight of the electrostatic ink composition. In another embodiment, the carrier liquid may constitute about 40 to 90% by weight of the electrostatic ink composition. In another embodiment, the carrier liquid may constitute about 60 to 80% by weight of the electrostatic ink composition. In another embodiment, the carrier liquid may constitute about 90 to 99.5% by weight of the electrostatic ink composition, optionally 95 to 99% by weight of the electrostatic ink composition.

Resin

Generally, the liquid electrophotographic inks described herein can include a resin. The resin will typically include a polymer other than the conducting polymer. The resin can include, but is not limited to, a thermoplastic polymer. In particular, the polymer of the resin may be selected from ethylene acrylic acid copolymers; methacrylic acid copolymers; ethylene vinyl acetate copolymers; copolymers of ethylene (e.g. 80 wt % to 99.9 wt %), and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl is optionally from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethyleneacrylic acid ionomers and combinations thereof.

The resin may comprise a polymer having acidic side groups. The polymer having acidic side groups may have an acidity of 50 mg KOH/g or more, optionally an acidity of 60 mg KOH/g or more, optionally an acidity of 70 mg KOH/g or more, optionally an acidity of 80 mg KOH/g or more, optionally an acidity of 90 mg KOH/g or more, optionally an acidity of 100 mg KOH/g or more, optionally an acidity of 105 mg KOH/g or more, optionally 110 mg KOH/g or more, optionally 115 mg KOH/g or more. The polymer having acidic side groups may have an acidity of 200 mg KOH/g or less, optionally 190 mg or less, optionally 180 mg or less, optionally 130 mg KOH/g or less, optionally 120 mg KOH/g or less. Acidity of a polymer, as measured in mg KOH/g can be measured using standard procedures known in the art, for example using the procedure described in ASTM D1386.

The resin may comprise a polymer, optionally a polymer having acidic side groups, that has a melt flow rate of less than about 60 g/10 minutes, optionally about 50 g/10 minutes or less, optionally about 40 g/10 minutes or less, optionally 30 g/10 minutes or less, optionally 20 g/10 minutes or less, optionally 10 g/10 minutes or less. Optionally, all polymers having acidic side groups and/or ester groups in the particles each individually have a melt flow rate of less than 90 g/10 minutes, 80 g/10 minutes or less, optionally 80 g/10 minutes or less, optionally 70 g/10 minutes or less, optionally 70 g/10 minutes or less, optionally 60 g/10 minutes or less.

The polymer having acidic side groups can have a melt flow rate of about 10 g/10 minutes to about 120 g/10 minutes, optionally about 10 g/10 minutes to about 70 g/10 minutes, optionally about 10 g/10 minutes to 40 g/10 minutes, optionally 20 g/10 minutes to 30 g/10 minutes. The polymer having acidic side groups can have a melt flow rate of optionally about 50 g/10 minutes to about 120 g/10 minutes, optionally 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitute from 5 wt % to about 25 wt % of the copolymer, optionally from 10 wt % to about 20 wt % of the copolymer.

The particles of the electrostatic ink composition may comprise a resin comprising two different polymers having acidic side groups. The two polymers having acidic side groups may have different acidities, which may fall within the ranges mentioned above. The particles may comprise a first polymer having acidic side groups that has an acidity of from 50 mg KOH/g to 110 mg KOH/g and a second polymer having acidic side groups that has an acidity of 110 mg KOH/g to 130 mg KOH/g.

The particles of the electrostatic ink composition may comprise two different polymers having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The particles of the electrostatic ink composition may comprise two different polymers having acidic side groups: a first polymer that is a copolymer of ethylene (e.g. 92 to 85 wt %, preferably about 89 wt %) and acrylic or methacrylic acid (e.g. 8 to 15 wt %, preferably about 11 wt %) having a melt flow rate of 80 to 110 g/10 minutes and a second polymer that is a co-polymer of ethylene (e.g. about 80 to 92 wt %, preferably about 85 wt %) and acrylic acid (e.g. about 18 to 12 wt %, preferably about 15 wt %), having a melt viscosity lower than that of the first polymer, the second polymer for example having a melt viscosity of 15000 poise or less, optionally a melt viscosity of 10000 poise or less, optionally 1000 poise or less, optionally 100 poise or less, optionally 50 poise or less, optionally 10 poise or less. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

In any of the embodiments mentioned above, the ratio of the first polymer having acidic side groups to the second polymer having acidic side groups can be from about 10:1 to about 2:1. In another embodiment, the ratio can be from about 6:1 to about 3:1, optionally about 4:1.

The particles may comprise a polymer having a melt viscosity of 15000 poise or less, optionally a melt viscosity of 10000 poise or less, optionally 1000 poise or less, optionally 100 poise or less, optionally 50 poise or less, optionally 10 poise or less; said polymer may be a polymer having acidic side groups as described herein. The particles may comprise a first polymer having a melt viscosity of 15000 poise or more, optionally 20000 poise or more, optionally 50000 poise or more, optionally 70000 poise or more; and optionally, the particles may comprise a second polymer having a melt viscosity less than the first polymer, optionally a melt viscosity of 15000 poise or less, optionally a melt viscosity of 10000 poise or less, optionally 1000 poise or less, optionally 100 poise or less, optionally 50 poise or less, optionally 10 poise or less. The particles may comprise a first polymer having a melt viscosity of more than 60000 poise, optionally from 60000 poise to 100000 poise, optionally from 65000 poise to 85000 poise; a second polymer having a melt viscosity of from 15000 poise to 40000 poise, optionally 20000 poise to 30000 poise, and a third polymer having a melt viscosity of 15000 poise or less, optionally a melt viscosity of 10000 poise or less, optionally 1000 poise or less, optionally 100 poise or less, optionally 50 poise or less, optionally 10 poise or less; an example of the first polymer is Nucrel 960 (from DuPont), and example of the second polymer is Nucrel 699 (from DuPont), and an example of the third polymer is AC-5120 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If particles comprise a single type of resin polymer (not including the conductive polymer), the resin polymer (excluding any other components of the liquid toner composition) may have a melt viscosity of 6000 poise or more, optionally a melt viscosity of 8000 poise or more, optionally a melt viscosity of 10000 poise or more, optionally a melt viscosity of 12000 poise or more. If the particles comprise a plurality of polymers all the polymers of the particles may together form a mixture (excluding any other components of the liquid toner composition) that has a melt viscosity of 6000 poise or more, optionally a melt viscosity of 8000 poise or more, optionally a melt viscosity of 10000 poise or more, optionally a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The particles of the electrostatic ink composition may comprise a resin comprising two different polymers having acidic side groups that are selected from copolymers of ethylene and an ethylenically unsaturated acid of either methacrylic acid or acrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The particles may comprise (i) a first polymer that is a copolymer of ethylene and an ethylenically unsaturated acid of either acrylic acid and methacrylic acid, wherein the ethylenically unsaturated acid of either acrylic or methacrylic acid constitutes from 8 wt % to about 16 wt % of the copolymer, optionally 10 wt % to 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from 12 wt % to about 30 wt % of the copolymer, optionally from 14 wt % to about 20 wt % of the copolymer, optionally from 16 wt % to about 20 wt % of the copolymer optionally from 17 wt % to 19 wt % of the copolymer.

In an embodiment, the resin constitutes about 5 to 90%, optionally about 5 to 80%, by weight of the solids of the electrostatic ink composition. In another embodiment, the resin constitutes about 10 to 60% by weight of the solids of the electrostatic ink composition. In another embodiment, the resin constitutes about 15 to 40% by weight of the solids of the electrostatic ink composition. In another embodiment, the resin constitutes about 60 to 90% by weight, optionally from 70 to 80% by weight, of the solids of the electrostatic ink composition.

The resin may comprise a polymer having acidic side groups, as described above (which is preferably free of ester side groups), and a polymer having ester side groups. The polymer having ester side groups is preferably a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, optionally 1 to 20 carbons, optionally 1 to 10 carbons; optionally selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, optionally an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1 to 50% by weight of the co-polymer, optionally 5 to 40% by weight, optionally 5 to 20% by weight of the copolymer, optionally 5 to 15% by weight of the copolymer. The second monomer may constitute 1 to 50% by weight of the co-polymer, optionally 5 to 40% by weight of the co-polymer, optionally 5 to 20% by weight of the co-polymer, optionally 5 to 15% by weight of the copolymer. In an embodiment, the first monomer constitutes 5 to 40% by weight of the co-polymer, the second monomer constitutes 5 to 40% by weight of the co-polymer, and with the third monomer constituting the remaining weight of the copolymer. In an embodiment, the first monomer constitutes 5 to 15% by weight of the co-polymer, the second monomer constitutes 5 to 15% by weight of the co-polymer, with the third monomer constituting the remaining weight of the copolymer. In an embodiment, the first monomer constitutes 8 to 12% by weight of the co-polymer, the second monomer constitutes 8 to 12% by weight of the co-polymer, with the third monomer constituting the remaining weight of the copolymer. In an embodiment, the first monomer constitutes about 10% by weight of the co-polymer, the second monomer constitutes about 10% by weight of the co-polymer, and with the third monomer constituting the remaining weight of the copolymer. The polymer having ester side groups may be selected from the Bynel® class of monomer, including Bynel 2022 and Bynel 2002, which are available from DuPont®.

The polymer having ester side groups may constitute 1% or more by weight of the total amount of the resin polymers in the particles, e.g. the total amount of the polymer or polymers having acidic side groups and polymer having ester side groups and excluding the conductive polymer. The polymer having ester side groups may constitute 5% or more by weight of the total amount of the resin polymers in the particles, optionally 8% or more by weight of the total amount of the resin polymers in the particles, optionally 10% or more by weight of the total amount of the resin polymers in the particles, optionally 15% or more by weight of the total amount of the resin polymers in the particles, optionally 20% or more by weight of the total amount of the resin polymers in the particles, optionally 25% or more by weight of the total amount of the resin polymers in the particles, optionally 30% or more by weight of the total amount of the resin polymers in the particles, optionally 35% or more by weight of the total amount of the resin polymers in the particles. The polymer having ester side groups may constitute from 5% to 50% by weight of the total amount of the resin polymers in the particles, optionally 10% to 40% by weight of the total amount of the resin polymers in the particles, optionally 15% to 30% by weight of the total amount of the polymers in the particles.

The polymer having ester side groups may have an acidity of 50 mg KOH/g or more, optionally an acidity of 60 mg KOH/g or more, optionally an acidity of 70 mg KOH/g or more, optionally an acidity of 80 mg KOH/g or more. The polymer having ester side groups may have an acidity of 100 mg KOH/g or less, optionally 90 mg KOH/g or less. The polymer having ester side groups may have an acidity of 60 mg KOH/g to 90 mg KOH/g, optionally 70 mg KOH/g to 80 mg KOH/g.

The polymer having ester side groups may have a melt flow rate of about 10 g/10 minutes to about 120 g/10 minutes, optionally about 10 g/10 minutes to about 50 g/10 minutes, optionally about 20 g/10 minutes to about 40 g/10 minutes, optionally about 25 g/10 minutes to about 35 g/10 minutes.

In an embodiment, the polymer or polymers can be selected from the Nucrel family of toners (e.g. Nucrel 403™, Nucrel 407™, Nucrel 609HS™, Nucrel 908HS™, Nucrel 1202HC™, Nucrel 3707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g. Aaclyn 201, Aclyn 246, Aclyn 285, and Aclyn 295), and the Lotader family of toners (e.g. Lotader 2210, Lotader, 3430, and Lotader 8200 (sold by Arkema)).

The resin can encapsulate the pigment during grinding or mixing to create an ink particle. The ink particle can have a final particle size from about 1 micron to about 10 microns and produce a printed image at thickness of about 1 micron per separation. The resin encapsulated pigments can be formulated to provide a specific melting point. In one example, the melting point can be from about 30° C. to about 150° C. In another example, the melting point can be from about 50° C. to about 100° C. Such melting points can allow for desired film formation during printing. The electrostatic ink composition may contain particles which comprise the resin, the pigment and the conductive particles, which may be homogenously distributed throughout each particle.

Pigment

As described generally, the present compositions and methods are directed towards pigmented liquid electrophotographic inks. As such, the pigments can be organic pigments of any color. In one aspect, the pigments can include phthalocyanine and/or azo pigments. In another aspect, the pigment can include biological chromophores. Additionally, the pigments can include inorganic pigments. In one aspect, the pigments can include metal, metal salts, metal compounds such as metal oxides, and coordinate complexes including their hydrates. Additionally, in one example, the pigments can include aryl groups. In another example, the pigments can include olefinic groups and/or systems. The pigment can be present in the liquid electrophotographic ink from about 0.01 wt % to about 60 wt % of solids. In still another example, the pigment can be present from about 0.1 wt % to about 40 wt %, optionally from 10 to 30 wt %, optionally 10 to 20 wt %, optionally 20 to 30 wt %, of the solids of the electrostatic ink composition.

In an embodiment, the pigment comprises or is a copper (II) phthalocyanine pigment. In an embodiment, the pigment is selected from CI Pigment Blue 15, CI Pigment Blue 15:1, CI Pigment Blue 15:2, CI Pigment Blue 15:3, CI Pigment Blue 15:4, CI Pigment Blue 15:6, CI Pigment Blue 16; Ci Pigment Green 7, CI Pigment Green 36. Such phthalocyanine pigments are known to the skilled person, and are described in the art, for example in Industrial Minerals and Their Uses—A Handbook and Formulary, Edited by Ciullo, P. A., published in 1996 by William Andrew Publishing/Noyes, see section 4.2.4.3; this book is incorporated herein by reference in its entirety. In an embodiment, the pigment is a cyan phthalocyanine pigment.

The pigment may also be selected from quinacridone pigments, dioxazine pigments and anthrone pigments.

Quinacridone has the formula

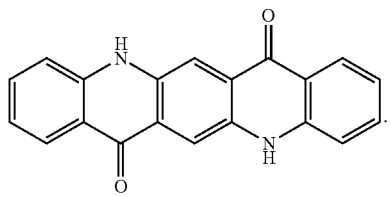 [SMILES: O=c1c2ccccc2[nH]c2cc3c(=O)c4ccccc4[nH]c3cc12]

The quinacridone pigment may be selected from pigment orange 48, pigment orange 49, pigment red 122, pigment red 202, pigment red 206, pigment red 207, pigment red 209, pigment violet 19, pigment violet 42.

The dioxazine pigment may be selected from pigment violet 23 and pigment violet 37.

Anthrone has the formula

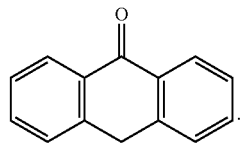 [SMILES: O=C1c2ccccc2Cc2ccccc21]

The anthrone pigment may be selected from pigment yellow 24, pigment orange 77, pigment red 168, pigment red 216, pigment violet 31, pigment blue 60, and pigment green 54.

Charge Director

The electrostatic ink composition may include a charge director. The charge director is added to the carrier liquid in order to maintain sufficient electrostatic charge on the ink particles. In an embodiment, the charge director may comprise ionic compounds, particularly metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. In an embodiment, the charge director is selected from, but is not limited to, oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates (e.g. see WO 2007/130069). In an embodiment, the charge director imparts a negative charge on the particles of the ink composition.

The charge director used herein can be any as known in the art such as described in U.S. Pat. No. 5,346,796, which is incorporated herein by reference in its entirety.

In an embodiment, the charge director comprises a sulfosuccinate moiety of the general formula [$R_{1'}$—O—C(O)CH$_2$CH(SO$_3^-$)OC(O)—O—$R_{2'}$], where each of $R_{1'}$ and $R_{2'}$ is an alkyl group. In an embodiment, the charge director comprises nanoparticles of a simple salt and a sulfosuccinate salt of the general formula MA$_n$, wherein M is a metal, n is the valence of M, and A is an ion of the general formula [$R_{1'}$—O—C(O)CH$_2$CH(SO$_3^-$)OC(O)—O—$R_{2'}$], where each of $R_{1'}$ and $R_{2'}$ is an alkyl group, or other charge directors as found in WO2007130069, which is incorporation herein by reference in its entirety. As described in WO2007130069, the sulfosuccinate salt of the general formula MA$_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 200 nm or less, optionally 2 nm or more. As described in WO2007130069, simple salts are salts that do not form micelles by themselves, although they may form a core for micelles with a micelle forming salt. The ions constructing the simple salts are all hydrophilic. The simple salt may comprise a cation selected from the group consisting of Mg, Ca, Ba, NH$_4$, tert-butyl ammonium, Li$^+$, and Al$^{+3}$, or from any sub-group thereof. The simple salt may comprise an anion selected from the group consisting of SO$_4^{2-}$, PO$^{3-}$, NO$_3^-$, HPO$_4^{2-}$, CO$_3^{2-}$, acetate, trifluoroacetate (TFA), Cl$^-$, Bf, F$^-$, ClO$_4^-$, and TiO$_3^{4-}$, or from any sub-group thereof. The simple salt may be selected from CaCO$_3$, Ba$_2$TiO$_3$, Al$_2$(SO$_4$), Al(NO$_3$)$_3$, Ca$_3$(PO$_4$)$_2$, BaSO$_4$, BaHPO$_4$, Ba$_2$(PO$_4$)$_3$, CaSO$_4$, (NH$_4$)$_2$CO$_3$, (NH$_4$)$_2$SO$_4$, NH$_4$OAc, Tert-butyl ammonium bromide, NH$_4$NO$_3$, LiTFA, Al$_2$(SO$_4$)$_3$, LiClO$_4$ and LiBF$_4$, or any sub-group thereof. The charge director may further comprise basic barium petronate (BBP).

In the formula [$R_1$—O—C(O)CH$_2$CH(SO$_3^-$)OC(O)—O—$R_{2'}$], optionally each of $R_{1'}$ and $R_{2'}$ is an aliphatic alkyl group. Optionally, each of $R_{1'}$ and $R_{2'}$ independently is a C$_{6-25}$ alkyl. Optionally, said aliphatic alkyl group is linear. Optionally, said aliphatic alkyl group is branched. Optionally, said aliphatic alkyl group includes a linear chain of more than 6 carbon atoms. Optionally, $R_{1'}$ and $R_{2'}$ are the same. Optionally, at least one of $R_{1'}$ and $R_{2'}$ is C$_{13}$H$_{27}$. Optionally, M is Na, K, Cs, Ca, or Ba. The formula [$R_1$—O—C(O)CH$_2$CH(SO$_3^-$)OC(O)—O—$R_{2'}$] and/or the formula MA$_n$ may be as defined in any part of WO2007130069.

The charge director may comprise (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda. The charge director may be as described in U.S. Pat. No. 5,266,435, which is incorporated herein by reference in its entirety.

In an embodiment, the charge director constitutes about 0.001% to 20%, optionally 0.01 to 20% by weight, optionally 0.01 to 10% by weight, optionally 0.01 to 1% by weight of the solids of the electrostatic ink composition. In another embodiment, the charge director constitutes about 0.001 to 0.15% by weight of the solids of the electrostatic ink composition, optionally 0.001 to 0.15%, optionally 0.001 to 0.02% by weight of the solids of the electrostatic ink composition. In an embodiment, the charge director imparts a negative charge on the particles. The particle conductivity may range from 50 to 500 pmho/cm, optionally from 200-350 pmho/cm.

Further Additives

The liquid toner composition may comprise one or more additives, for example an additive selected from a charge adjuvant, a wax, a surfactant, biocides, organic solvents, viscosity modifiers, materials for pH adjustment, sequestering agents, preservatives, compatibility additives, emulsifiers and the like. The wax may be an incompatible wax.

The present invention further provides a method of producing an electrostatic ink composition, the method comprising:
combining a carrier liquid, a resin, a pigment, a conductive polymer and optionally a charge director, such that the electrostatic ink composition of the first aspect is formed. The method can comprise mixing the resin, the conductive polymer and the carrier liquid under appropriate conditions, optionally in the present of the pigment, to form the particles comprising the resin, the pigment, and the conductive polymer within the carrier liquid; and then optionally mixing the charge director with the carrier liquid. One or more further additives as described herein may be added at any time during the method. The steps described above are not intended to be bound by any particular order. For example, the mixing of the resin with the carrier liquid may be performed before, after, or concurrently with the step of combining the charge director with the carrier liquid. Additionally, the steps may be combined or performed in a different order as is known in the art. Additionally, the steps may include other necessary processing steps as is known in the art. For example, the step of combining the resin and the conductive polymer can include grinding the resin and the conductive polymer and, optionally, the pigment, in the liquid carrier. This forms particles, each of which contains the resin, conductive polymer and the pigment.

The present invention further provides a method of electrophotographic printing an electrostatic ink composition according to the first aspect, wherein the ink composition comprises particles comprising the resin, the pigment and the conductive polymer dispersed in the liquid carrier, the method comprising:
forming a latent electrostatic image on a surface;
contacting the surface with the electrostatic ink composition according to the first aspect, such that at least some of the particles adhere to the surface to form a developed toner image on the surface, and transferring the toner image to a print substrate.

The surface on which the latent electrostatic image is formed may be on a rotating member, e.g. in the form of a cylinder. The surface on which the latent electrostatic image is formed may form part of a photo imaging plate (PIP). The contacting may involve passing the electrostatic composition of the first aspect between a stationary electrode and a rotating member, which may be a member having the surface having a latent electrostatic image thereon or a member in contact with the surface having a latent electrostatic image thereon. A voltage is applied between the stationary electrode and the rotating member, such that the particles adhere to the surface of the rotating member. This may involve subjecting the electrostatic ink composition to an electric field having a field gradient of 50-400V/μm, or more, optionally 600-900V/μm, or more.

The intermediate transfer member may be a rotating flexible member, which is optionally heated, e.g. to a temperature of from 80 to 160° C., optionally from 90 to 130° C., optionally from 100 to 110° C.

The print substrate may be any suitable substrate. The substrate may be any suitable substrate capable of having an image printed thereon. The substrate may comprise a material selected from an organic or inorganic material. The material may comprise a natural polymeric material, e.g. cellulose. The material may comprise a synthetic polymeric material, e.g. a polymer formed from alkylene monomers, including, but not limited to, polyethylene and polypropylene, and co-polymers such as styrene-polybutadiene. The polypropylene may optionally be biaxially orientated polypropylene. The material may comprise a metal, which may be in sheet form. The metal may be selected from or made from, for instance, aluminum (Al), silver (Ag), tin (Sn), copper (Cu), mixtures thereof. In an embodiment, the substrate comprises a cellulosic paper. In an embodiment, the cellulosic paper is coated with a polymeric material, e.g. a polymer formed from styrene-butadiene resin. Optionally, the cellulosic paper has an inorganic material bound to its surface (before printing with ink) with a polymeric material, wherein the inorganic material may be selected from, for example, kaolinite or calcium carbonate. The substrate is optionally a cellulosic print substrate such as paper. The cellulosic print substrate is optionally a coated cellulosic print substrate, e.g. having a coating of a polymeric material thereon.

The method of the third aspect may be carried out so that a plurality of impressions or copies are carried out. The number of impressions or copies may be at least 1000, optionally at least 2000, optionally at least 3000, optionally at least 5000. The print coverage on each print substrate in each impression may be 40% or less, optionally 30% or less, optionally 20% or less. An impression may be a single image of one colour formed on a print substrate. A copy may be a single image having a plurality of colours, e.g. selected from black, magenta, cyan and yellow.

The method of the third aspect may be carried out so that a plurality of print substrate sheets are printed, for example 250 or more print substrate sheets, optionally 500 or more print substrate sheets, optionally 750 or more print substrate sheets, optionally 1000 or more print substrate sheets. The sheets may be any suitable size or shape, e.g. of standard printing size, such as A4 or A3.

EXAMPLES

The following examples illustrate a number of variations of the present compositions and methods that are presently known to the inventors. However, it is to be understood that the following are only exemplary or illustrative of the application of the principles of the present compositions and methods. Numerous modifications and alternative compositions and methods may be devised by those skilled in the art without departing from the spirit and scope of the present compositions and methods. The appended claims are intended to cover such modifications and arrangements. Thus, while the present compositions and methods have been described above with particularity, the following examples provide further detail in connection with what are presently deemed to be acceptable.

Materials and Experiment Procedure:

Polypyrrole (PP) polymer was supplied by Sigma Aldrich; this polymer had a relatively high conductivity property of 10-40 S/cm. This PP polymer uses a sulfonic acid as a dopant. Another polymer was polyaniline (PANI) purchased from Panipol company and the grade received is of an emeraldine salt (ES) in which the PANI is doped by an acid in which the monomeric nitrogen is protonated and enables the conduction of negative charge. The material is 94% by weight pure PANI and 6% by weight water. This polymer can reach a 1 S/cm conductivity in Toluene. Other types of polymer tested were Polyvinyl pyrrolidone 121 and 540, which is produced by ISP; this polymer also contains a pyrrolidone group.

EXPERIMENT

Example 1

Preparation of a Reference Cyan Electrostatic Ink Composition (Containing No Conductive Polymers), 2% by Weight NVS The OD drop or electrical fatigue problem was observed on Cyan 4.0 or Cyan 4.5 Electroinks, available from Hewlett Packard. Accordingly, the present inventors tested these inks to determine whether or not conductive polymers could overcome or mitigate the problem. These Electroink solutions were produced using a lab grinding tool called attritor S1, by mixing the formulation as set out below in Table I:

TABLE I

| Cyan | El 4.0 (wt %) | Weight attritor (g) | % NVS |
|---|---|---|---|
| Resins | 76.8 | 1503.3 | 25% |
| TB5 | 12.1 | 59.21 | |
| BSG87 | 0.9 | 4.40 | |
| VCA | 2.2 | 10.77 | |
| HPB | 6 | | |
| DS72 | 2 | 9.79 | |
| Sol-L | | 712.5 | |
| % NVS atr. | 20.00% | | |
| Total weight atr. | 2300 | 2300 | |

The 'Resins' used in the above were Nucrel 699, available from DuPont, and A-C 5120, available from Honeywell, in the weight ratio of 4:1.

TB5 indicates a main Cyan pigment, a phthalocyainin pigment blue 15:3 provided by TOYO company.

BSG87 indicates a secondary Cyan pigment, a phthalocyanin pigment green 7 provided by BASF company.

VCA indicates an aluminium tristearate and palmitate salt, available from Riedel de-Haan.

HPB indicates an homopolymer polyethylene wax, available under the trade name Acumist B6 from Honeywell company.

DS72 is a silica powder, available under the trade name Aerosil R 7200 from Degussa-Evonik.

Sol-L indicates Isopar L, an iso-parfinic oil manufactured by EXXON.

The HPB was added later to the ink dispersion while mixing.

The grinding was carried out in two steps:
i) Hot stage—53° C. for 1.5 hour.
ii) Cold stage—45° C. for 10.5 hour.

This produced an ink having about 20% solids content. This ink is then diluted to 2% NVS or 3% NVS, for El 4.0 or El 4.5, respectively, and then the following additives added, as shown in Table II:

TABLE II

|  | W-12 | NCD | SVM | SE-15 | Marcol | HPB |
|---|---|---|---|---|---|---|
| Cyan 4.0 (and 4.5*) | 4% W12/ ink solids | 1.5 mg NCD solids | 0.07 mg SVM300/ (4.0)/g gr Sol-L | 0.0051 mg SE15/ gr Sol-L | 8.5 mg M-1/gr Sol-L | 6% on solids |

*unless stated otherwise below

W12 is a Teflon powder.

SVM is high viscous, 300 kcSt, Silicon oil, available under the trade name SIG5840 from ABCR. (present in El 4.0, but not in El 4.5).

SE-15 is a defoamer silicon additive, available under the trade name KSG-15 from ShinEtsu. (present in El 4.0, but not in El 4.5).

Marcol is a high viscous paraffinic oil with a viscosity of 0.83 gr/cc. Amount for El4.0 shown in table; for El 4.5 it was reduced to 0.5 mg/1 gr Isopar.

NCD—this indicates a natural charge director having the components: (i) natural soya lecithin, (ii) basic barium petronate, and (iii) dodecyl benzene sulphonic acid, with the components (i), (ii) and (iii) being present in the weight ratios of 6.6%:9.8:3.6%. The charge director was usually added until the low field conductivity, LFC, of 70 was reached.

Example 2

Preparation of a Cyan Electrostatic Ink Composition Containing 3% w/w Polypyrrole (PP) Polymer The method of Example 1 was repeated, except that 13.8 g of polypyrrole polymer was added to the composition at the start of the grinding step. The resulting solids of the composition contained 3% w/w PP polymer.

Example 3

Preparation of a Cyan Electrostatic Ink Composition Containing 1.3% w/w Polyaniline (PA) Polymer The method of Example 1 was repeated, except that 5.98 g of polyaniline polymer was added to the composition at the start of the grinding step. The resulting solids of the composition contained 1.3% w/w PA polymer.

Example 4

Preparation of a Cyan Electrostatic Ink Composition Containing 1.3% w/w Polyvinyl Pyrrolidone (PVP) Polymer The method of Example 1 was repeated, except that 5.98 g of a polyvinyl pyrrolidone polymer was added to the composition at the start of the grinding step. The resulting solids of the composition contained 1.3% w/w PVP polymer. Two similar PVP-containing compositions were prepared—one containing PVP 121, available from ISP, and the other containing PVP 540, again available from ISP.

General Procedure for Testing the Change in Optical Density

A Cyan electrostatic ink composition is prepared in accordance with one of the Examples 1 to 4 above. The ink composition is charged in the lab to LFC=70 pmho/cm where on the press it is brought to a LFC=85 pmho/cm, the Cyan set point conductivity on press. After calibrating the density meter and setting the conductivity a color adjust is done in order to write the down the developing voltage, verifying the OD is at the specification window. In order to gain efficiency in each test there is a reference sample which run parallel to another 3 experimental samples. The test start by a run of 1000 impression in a stress mode where the printing coverage is 0.1% of the press or 250 impressions of each tested sample. Then a color adjust is performed and the developing voltage, OD, conductivity and other press parameters written down. This cycle is repeated again with another 1000 impressions and a check of the press parameters. Each impression was a block of colour printed on a print substrate—in each impression a 0.1% coverage of Cyan 4.0 ink was pressed to a substrate. Unless otherwise stated herein, the print substrate was an uncoated paper.

A regular test lasted for 10-12 k impressions in order to obtain severe increase in DRV (developing voltage) for the reference Cyan sample, close to window edge, in order to compare it to experimental samples.

The main analysis carried out in each test is the change in optical density over a number of impressions. Since this phenomena depends on many factors of ink and press conditions, the present inventors did not always get exactly the same results for each solution. The results presented below are representative of many tests carried out.

Figure 2:
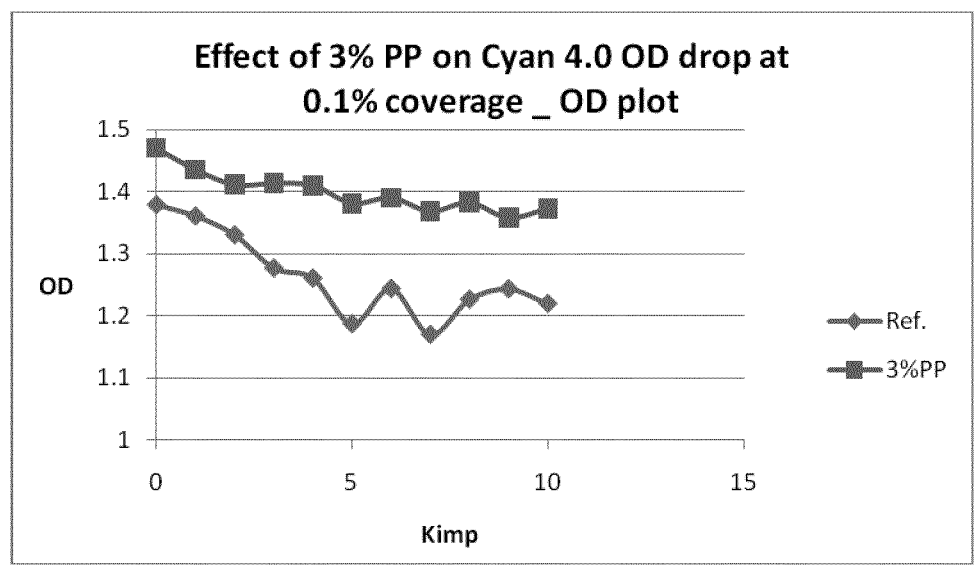
FIG. 2 shows a plot of optical density against the number of impressions, at a constant developing voltage, for a reference electrostatic ink composition and a cyan electrostatic ink composition that contains 3 wt % polypyrrole, when printing at 0.1% coverage. This is described in more detail in the Examples.

Results:

A significant improvement in the Optical Density (OD) drop of Cyan 4.0 and 4.5 electroinks was obtained using 3% of PP in respect to ink solids (i.e. the ink composition of Example 2 had less of a drop in OD then the Ink Composition of Example 1 under the same conditions). As in other possible solutions that were checked for the effect on Cyan OD drop, the conductive polymer is added at the start of the grinding process since the pigments are added at this stage and most of fatigue phenomena occur on the phthalocyanine pigment. As in other tests the test was carried out at stress conditions of about 0% coverage, which is far from the usual printing at low coverage that run at 8-10% and mainly above. In the test carried out with the cyan reference working dispersion (Example 1) and other tested samples (Examples 2 to 4), 3% of PP was shown to decrease significantly the OD drop as seen in FIG. 1. The 3% PP working dispersion indeed starts at a bit higher OD but the delta OD in this decline is of 6.6% of the original OD while in the reference, it achieve 11%. The OD plot of these samples is shown in FIG. 2. Here we can see that OD is still in the acceptable working window, from 1.4 up to 1.5 where the working point for Cyan is 1.45.

Figure 3A:
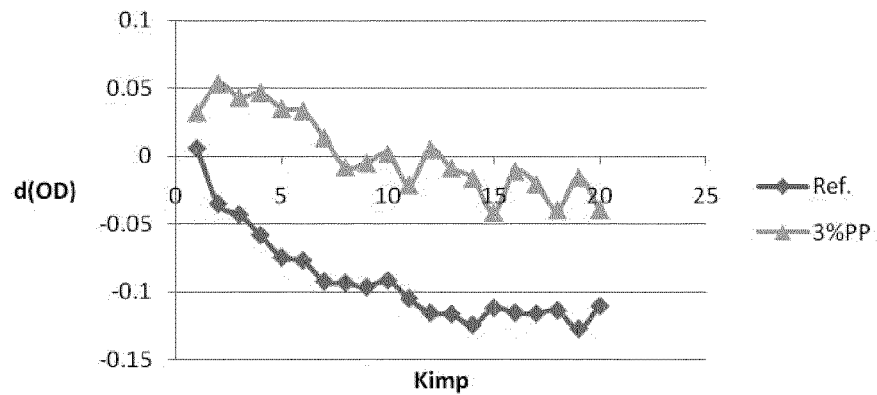
FIG. 3A shows the change in optical density (d(OD), y axis), against the number of impressions for a reference electrostatic ink composition and a cyan electrostatic ink composition that contains 3 wt % polypyrrole, at a constant developing voltage, when printing at 0.1% coverage. This is described in more detail in the Examples.

Another result that shows the strong effect of 3% of PP is shown in FIG. 3A. Here again, the decline in OD drop is significantly restrained compare to reference although the decline in reference sample is smaller than usual and reach only ~0.1 delta OD instead of 0.3.

Another feature that correlates well with the OD drop in cyan electrostatic ink's fatigue is the developing voltage, although it is a rougher parameter compared to direct measurement of the delta OD (i.e. change in OD). Here the effect is opposite, where the developing voltage increases from the start of the test to its end (while keeping the optical density constant). In the both tests described above with the inks containing the polypyrrole, the increase in developing voltages is only 30 v whereas the increase in reference sample is between 80 to 110 v. Here we can see that the unusual decrease of ~0.1 delta OD corresponds well to the increase of 80 v which is relatively low for a reference working dispersion. The typical increase in developing voltage for a reference working dispersion is for about 120-130 v. Since various parameters change in the press and ink during press operation, the fatigue phenomena exhibits a statistical behavior that results in a distribution of output data such as DRV, OD, ink charging etc., so, the experimental values given herein are to be regarded as averaged values from a number of tests.

Figure 3B:
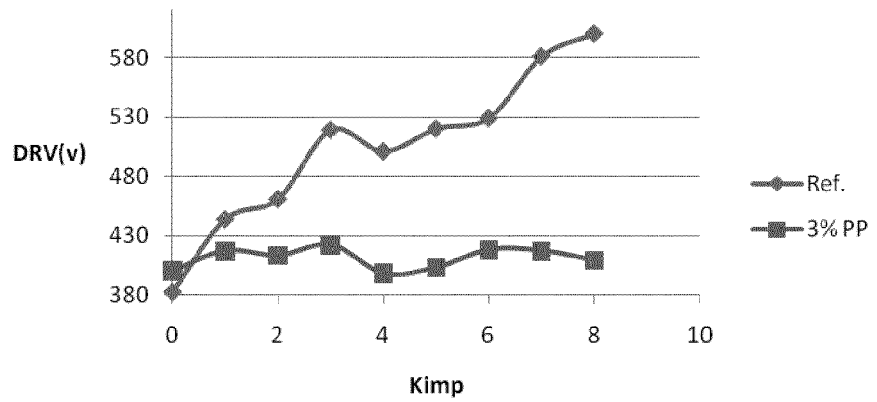
FIG. 3B shows the change in developing voltage (DRV, V, y axis) for a reference ink composition and a cyan electrostatic ink composition that contains 3 wt % polypyrrole, keeping the OD constant, and printing at 0% coverage.

FIG. 3B shows the developing voltage recorded at each 1 kimp for the reference ink (Example 1) and the ink containing 3% PP. As one can see, at 0 Kimp, i.e. at time=0, the DRV is about the same for both inks, but they diverge significantly with 0% coverage printing with increasing impressions, until 8 kimp (when measurement was stopped). Instead of looking at the OD with a fixed DRV (developing voltage), here the inventors fixed the OD and observed the change in developing voltage, which correlates to ink charging, or more accurately, to ink particle conductivity.

Figure 4:
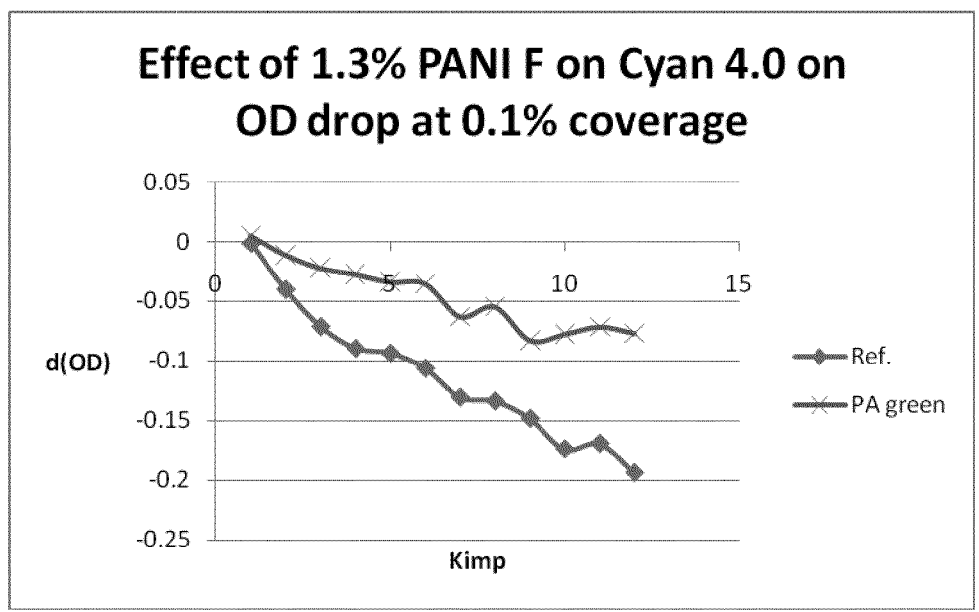
FIG. 4 shows the change in optical density (d(OD), y axis), against the number of impressions for a reference electrostatic ink composition and a cyan electrostatic ink composition that contains 1.3 wt % PANI F, at a constant developing voltage, when printing at 0.1% coverage. This is described in more detail in the Examples.

Another conductive polymer that also affects the OD drop of cyan electrostatic inks is PANI, an emeraldine salt polyaniline. The conductivity is obtained with doping of sulfonic acids to form a salty PANI where the nitrogen is positively charged which enables the conduction of negative charge. Here we used PANI F with the amount of 1.3% of the solids added at the start of grinding (i.e. produced in accordance with Example 3 above). There are some tests where no effect of PANI F was seen (as in the above) while there were tests that showed a significant effect on OD drop compare to reference. In FIG. 4, we show its effect on a coated Euroart paper. The decline in OD for 12 kimp at a stress test of 0% coverage was 5.3% of the original OD while the reference declined by more than 13%.

Figure 5:
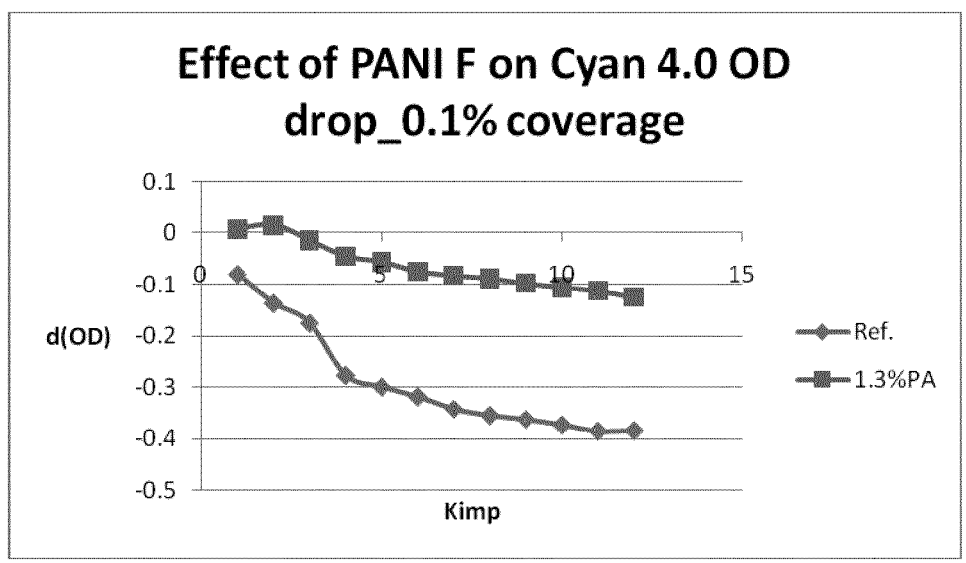
FIG. 5 shows the change in optical density (d(OD), y axis), against the number of impressions for a reference electrostatic ink composition and a cyan electrostatic ink composition that contains 1.3 wt % PANI F, at a constant developing voltage, when printing at 0.1% coverage. This is described in more detail in the Examples.

A similar test was also carried out on a plastic substrate called BOPP (bi-axially oriented polypropylene), and the results were remarkable—they are shown in FIG. 5. Here you can see that the effect of PANI F is about quarter in delta OD of the delta OD decline measured for the reference. In numeric results the Cyan working dispersion with PANI F (i.e. Example 3) declines by 8.6% from the original OD while the reference (Example 1) declines by 24% of the original OD. Here again, as in the case of PP and other solutions that were checked for the OD drop problem in Cyan electroinks, the developing voltages rise much less than the reference. In the current test, the developing voltage for PANI F working dispersion rises by 36 v where the reference rose by 165 v; this corresponds with the OD measurements. Since PP and PANI F are colored conductive polymer with a green to dark blue color gave a delta E of 6.6 to 7.7 from target Cyan color in the Panton 3D space. This is no a large deviation in color with using the conductive polymers, and any color deviation can be fixed by using altering the pigment composition of the cyan electroink formulation, as would be appreciated by the skilled person.

Figure 6:
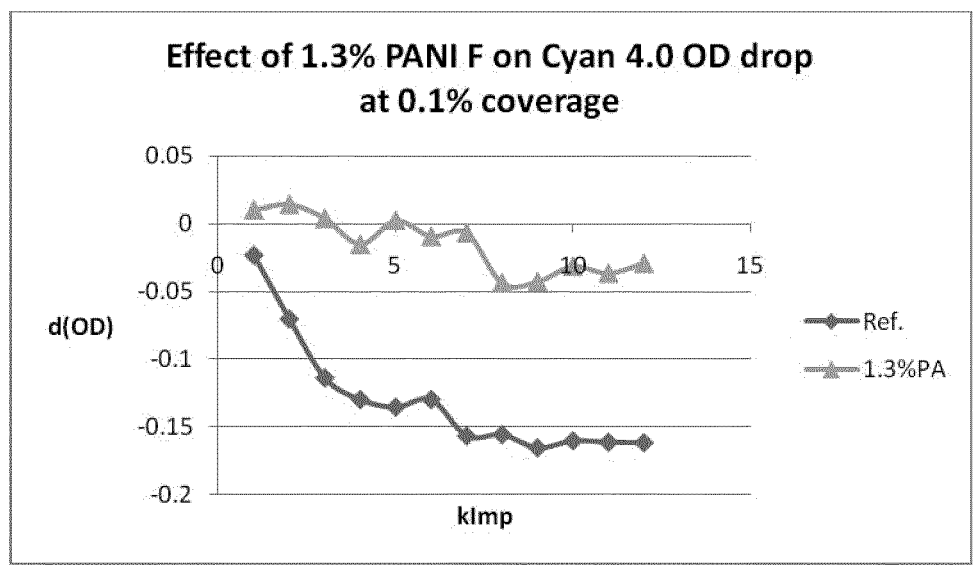
FIG. 6 shows the change in optical density (d(OD), y axis), against the number of impressions for a reference electrostatic ink composition and a cyan electrostatic ink composition that contains 1.3 wt % PANI F, at a constant developing voltage, when printing at 0.1% coverage. This is described in more detail in the Examples.

FIG. 6 shows another test over 12 kimp comparing the effect of 1.3% PANI F in Cyan Electroink 4.0 OD drop at 0.1% coverage.

Table 3 below shows the recording of developing voltage for PANI F Cyan ink and the reference Cyan ink (Example 1) at 0 kimp at the start of the test where OD is kept by performing a color adjust (CA) procedure and then at the end of the test after 10 kimp where again we fix the OD wanted and observe the change in DRV in both inks.

TABLE 3

1.3% PANI F on Cyan 4.0 OD drop_press test results
7.7.09 Jericho 19
Cyan 4.0 Ref. from can −1.7 density

| Kimp | DRV(v) | ELV(v) | LP | OD | LF | V light |
|---|---|---|---|---|---|---|
| Ref. | | | | | | |
| CA at 0 Kimp | 415 | 464 | 15 | 1.44 | 84 | 50 |
| CA after 10 Kimp | 560 | 464 | 15 | 1.29 | 81 | 41 |
| d(DRV) | −52 | | | | | |

TABLE 3-continued 1.3% PANI F on Cyan 4.0 OD drop_press test results
7.7.09 Jericho 19
Cyan 4.0 Ref. from can −1.7 density

| Kimp | DRV(v) | ELV(v) | LP | OD | LF | V light |
|---|---|---|---|---|---|---|
| 1.3% PA | | | | | | |
| CA at 0 Kimp | 463 | 538 | 15 | 1.43 | 82 | 50 |
| CA after 10 Kimp | 544 | 538 | 15 | 1.43 | 76 | 41 |
| d(DRV) | −52 | | | | | |

Figure 7:
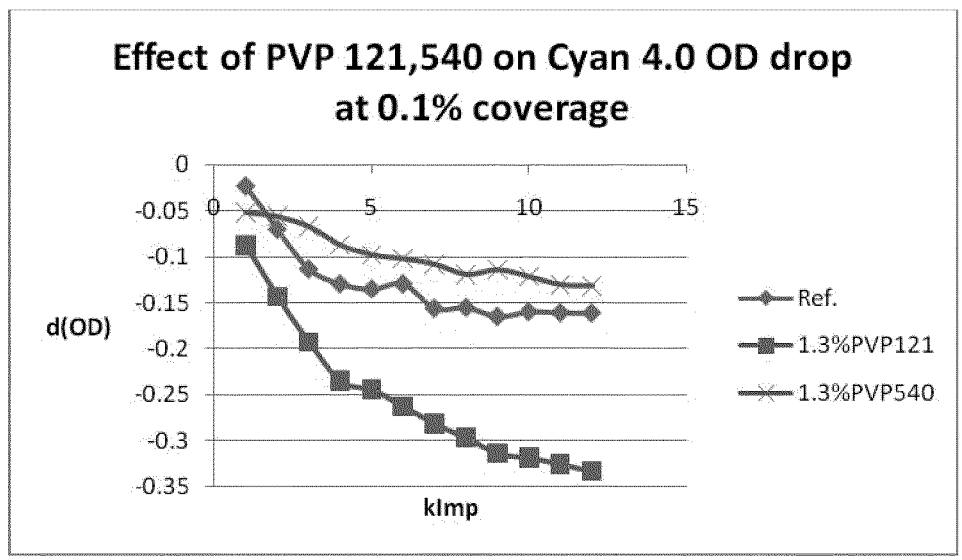
FIG. 7 shows the change in optical density (d(OD), y axis), against the number of impressions for a reference electrostatic ink composition and two electrostatic ink compositions that contain different types of polyvinylpyrrolidone, at a constant developing voltage, when printing at 0.1% coverage. This is described in more detail in the Examples.

Another type of polymer tested was PVP (Polyvinyl pyrrolidone), i.e. in the ink composition of Example 4 above. Two types were tested in ink compositions: PVP 540 and PVP 121, both from ISP. PVP 540 supplied by ISP contains a pyrrolidone group for each monomer, whereas PVP 121, in addition to the pyrrolidone group, also has dimethylaminopropyl methacrylamide group for each monomer. The present inventors wished to test whether the pyrrolidone group would be capable of charge conduction in the ink particles, although no pi conjugated system is present in this polymer. As seen above, in most of the tests no positive effect was seen with the non-conducting PVP polymer and at the best it performed as well as the reference cyan electroink. In FIG. 7, there is another example for the appropriate system for charge conduction needed to significantly eliminate the OD drop problem. Here again, you can see that PVP polymers that lack the right chemistry for charge conduction do not solve the OD drop problem in cyan electroink and exhibit the same severe problem in OD drop as the reference working dispersion of Example 1.

Summary of Test Results

The text above illustrate that using conductive polymers mitigated the problem of optical density drop in cyan electrostatic inks. Without being bound by theory, this was believed to be because these polymers channel out excess charge that is meta-stabilized on the phthalocyanine pigments.

The present inventors found that relatively low amounts of conductive polymers, such as PP and PANI F (doped version of PANI) significantly reduce the OD drop in cyan electrostatic ink compositions. Although not always repeated, in most of the tests PP was observed to reduce the OD decline by 60-70%, especially when present in an amount of 3% by weight of the solids content of the ink composition.

PANI F was also able to reduce the drop in OD for cyan electrostatic inks, but its effect seemed smaller than PP. PANI F has a different charge conduction mechanism based on the acid dopant of polyaniline and is reported to have a lower conductivity than PP. This may explain why good performance with PANI F was seen in fewer tests than with PP. PVP polymers did not seem to have much, if any, effect on reducing the drop in optical density, which may be because they do not have any appropriate chemistry for charge conduction, e.g. no positive dopant sites on polymer backbones, nor conjugated system of pi orbitals as in PP. This would seem to support the theory that the conductive polymer removes charge from the pigments by electrical conduction. In addition, the price of PP and PANI F for the amount needed to significantly reduce the fatigue problem are reasonable. The change in cyan color expressed by delta E, the color vector in the Panton 3 DM was not big and it is possible to fix it by an appropriate pigments composition of main (Blue Phthalocyanin) and secondary pigment (e.g. Green Phthalocyanin) in the Cyan electroink formulation. No other adverse effects in electrostatic ink charging or other properties were observed.

Generally, the present inventors found that the effect of the conductive polymers did not depend on the print substrate.

While the invention has been described with reference to certain embodiments, those skilled in the art will appreciate that various modifications, changes, omissions, and substitutions can be made without departing from the spirit of the disclosure. It is intended, therefore, that the invention be limited only by the scope of the following claims. Unless otherwise stated, the features of any dependent claim can be combined with the features of any of the other dependent claims.

The invention claimed is:

1. An electrostatic ink composition comprising particles formed by grinding a resin, a pigment and a conductive polymer together in a carrier liquid to form particles, at least some of which each contain the resin, the pigment and the conductive polymer.

2. An electrostatic ink composition according to claim 1, wherein the conductive polymer is selected from a poly(fluorene), a polyphenylene, a polypyrene, a polyazulene, a polynaphthalene, a poly(acetylene), a poly(p-phenylene vinylene), a poly(pyrrole), a polycarbazole, a polyindole, a polyazepines, a polyaniline, a poly(thiophene), a poly(3,4-ethylenedioxythiophene), a poly(p-phenylene sulfide), a polythienylenevinylene and a poly-1,6-heptadiyne.

3. An electrostatic ink composition according to claim 1, wherein the conductive polymer is selected from polyaniline and polypyrrole.

4. An electrostatic ink composition according to claim 1, wherein the conductive polymer constitutes at least 0.5 weight % of the solids content of the electrostatic ink composition.

5. An electrostatic ink composition according to claim 1, wherein the conductive polymer constitutes from 1 weight % to 5 weight % of the solids content of the electro static ink composition.

6. An electrostatic ink composition according to claim 1, wherein the conductive polymer has a conductivity of at least 1 S/cm.

7. An electrostatic ink composition according to claim 1, wherein the weight ratio of the conductive polymer to pigment in the electrostatic ink composition is 1:26 to 1:3.

8. An electrostatic ink composition according to claim 1, wherein the pigment comprises an organic compound having conjugated double bonds and/or aromatic rings or a charge acceptor unit.

9. An electrostatic ink composition according to claim 1, wherein the pigment comprises a pigment selected from a phthalocyanine pigment, a quinacridone pigment, a dioxazine pigment and an anthrone pigment.

10. An electrostatic ink composition according to claim 1, wherein the pigment comprises a phthalocyanine pigment selected from CI Pigment Blue 15, CI Pigment Blue 15:1, CI Pigment Blue 15:2, CI Pigment Blue 15:3, CI Pigment Blue 15:4, CI Pigment Blue 15:6, CI Pigment Blue 16; CI Pigment Green 7 and CI Pigment Green 36, and combinations thereof.

11. A method of electrophotographic printing an electrostatic ink composition according to claim 1, wherein the ink composition comprises particles comprising the resin, the pigment and the conductive polymer dispersed in the liquid carrier, the method comprising:
   forming a latent electrostatic image on a surface;
   contacting the surface with the electrostatic ink composition according to claim 1, such that at least some of the particles adhere to the surface to form a developed toner image on the surface, and transferring the toner image to a print substrate.

12. A method according to claim 11, wherein at least 1000 impressions are carried out.

13. A method according to claim 12, wherein the print substrate comprises a cellulosic paper or a sheet of a polymer formed from alkylene monomers.

14. A method of producing an electrostatic ink composition, the method comprising:
   grinding a resin, a pigment, a conductive polymer together in a carrier liquid, to form particles, at least some of which each contain the resin, the pigment and the conductive polymer, such that the electrostatic ink composition of claim 1 is formed.

* * * * *

UNITED STATES PATENT AND TRADEMARK OFFICE
CERTIFICATE OF CORRECTION

| | |
|---|---|
| PATENT NO. | : 9,188,896 B2 |
| APPLICATION NO. | : 14/347569 |
| DATED | : November 17, 2015 |
| INVENTOR(S) | : Gil Bar-Haim et al. |

It is certified that error appears in the above-identified patent and that said Letters Patent is hereby corrected as shown below:

Claims

In column 23, line 37 approx., in Claim 5, delete "electro static" and insert -- electrostatic --, therefor.

Signed and Sealed this
Thirty-first Day of May, 2016

Michelle K. Lee
*Director of the United States Patent and Trademark Office*